United States Patent [19]

Eto et al.

[11] Patent Number: 4,893,239

[45] Date of Patent: Jan. 9, 1990

[54] DEVICE FOR DETECTING DRIVING CONDITION FOR AUTOMOBILE

[75] Inventors: Kunihiko Eto, Toyota; Yutaka Mori, Okazaki; Shigeo Tanooka; Kazumasa Kodama, both of Okazaki, all of Japan

[73] Assignee: Toyoda Koki Kabushiki Kaisha, Kariya, Japan

[21] Appl. No.: 156,012

[22] Filed: Feb. 16, 1988

[30] Foreign Application Priority Data

Feb. 16, 1987 [JP] Japan .................................. 62-32927

[51] Int. Cl.⁴ .............................................. B62D 5/06
[52] U.S. Cl. ................................ 364/424.05; 480/142
[58] Field of Search ....................... 364/424.05, 426.04; 180/79.1, 132, 141-143; 74/388 PS

[56] References Cited

U.S. PATENT DOCUMENTS

| | | | |
|---|---|---|---|
| 4,374,422 | 2/1983 | O'Keefe, Jr. et al. | 364/426.04 |
| 4,538,698 | 9/1985 | Hashimoto et al. | 180/142 |
| 4,685,528 | 8/1987 | Suzuki et al. | 364/424.05 |
| 4,730,686 | 3/1988 | Shimizu | 364/424.05 |
| 4,773,498 | 9/1988 | Eto et al. | 180/79.1 |
| 4,793,431 | 12/1988 | Eto et al. | 364/424.05 |

Primary Examiner—Gary Chin
Attorney, Agent, or Firm—Oblon, Spivak, McClelland, Maier & Neustadt

[57] ABSTRACT

A device for detecting driving condition faced by an operator of an automobile. The device includes an automobile speed sensor, first arithmetic means, second arithmetic means and compensating means. The first arithmetic means computes a driving condition index by using automobile speed information. The second arithmetic means computes limit value changing according to the increment in the automobile speed. The compensating means compare the change amount of the driving condition index for a predetermined time period with the limit value and compensate the driving condition index in such a way that the change amount of the driving condition is limited to the limit value when the change amount exceeds the limit value in order to give the operator a natural feel of the road.

8 Claims, 15 Drawing Sheets

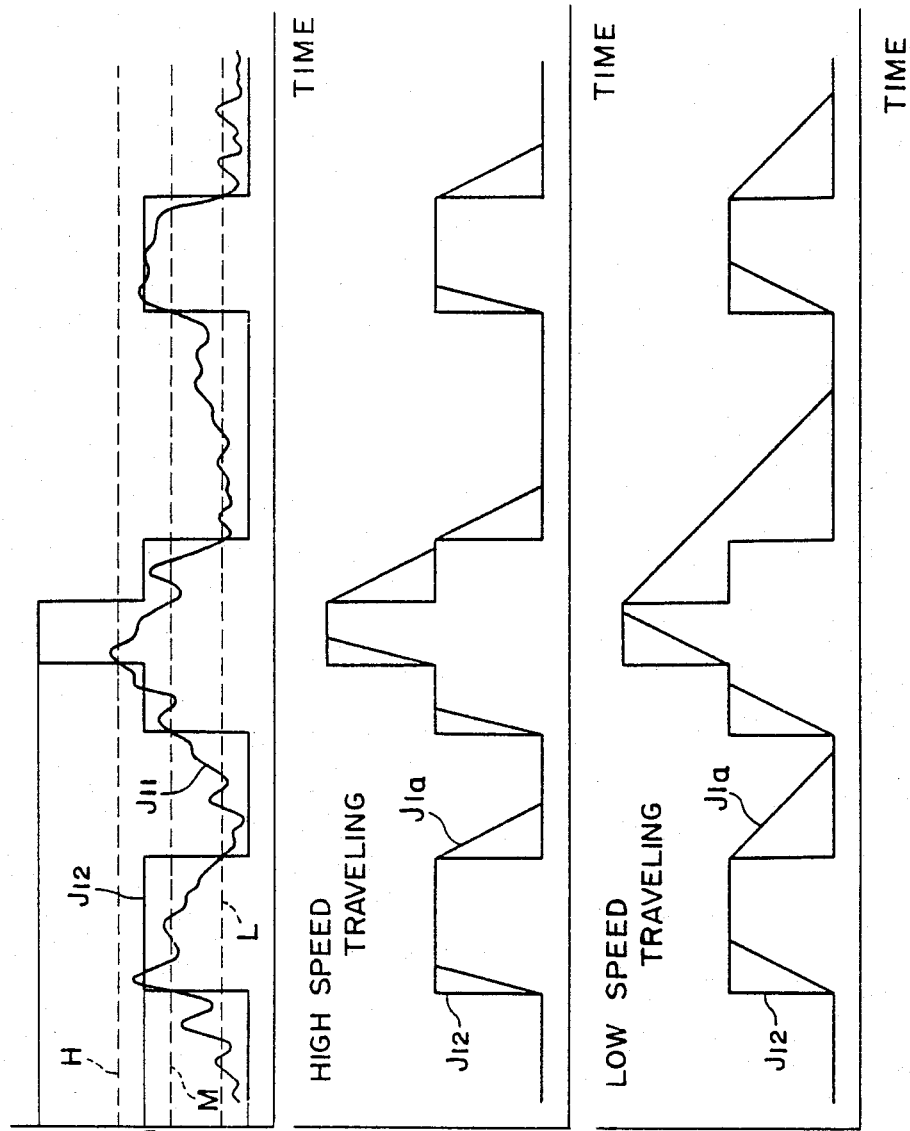

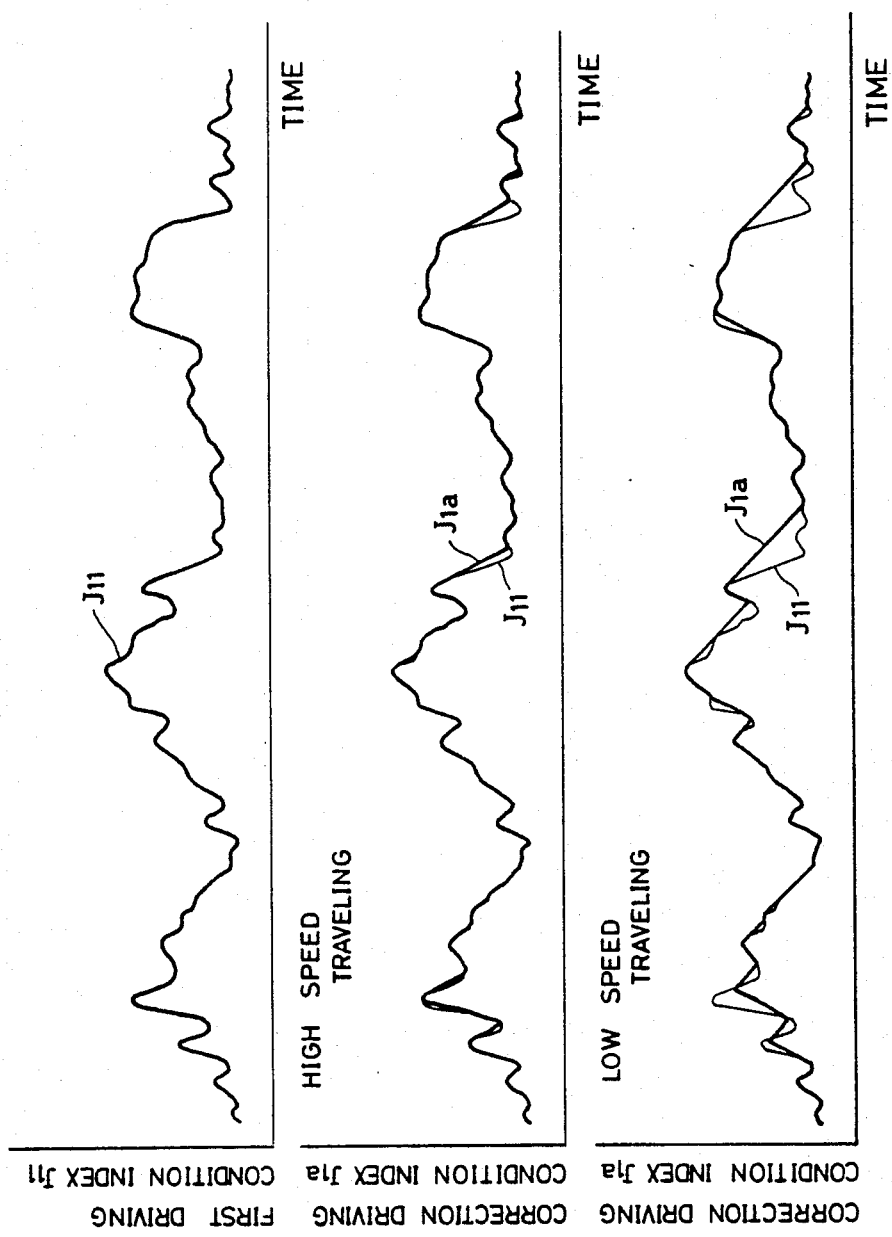

DEVICE FOR DETECTING DRIVING CONDITION FOR AUTOMOBILE

BACKGROUND OF THE INVENTION

1. Field of the Invention

The present invention relates to a device for detecting the manner in which an automobile is driven in order to control the steering characteristics of a power steering apparatus, the height of the automobile etc.

2. Discussion of Background

Previously, the traveling conditions of the automobile were generally detected on the basis of the automobile speed. Then, the detected traveling conditions were used for controlling, for example, the assist force of a power steering apparatus so that this force becomes large in a range of lower velocities but small in a range of higher velocities. For instance, as disclosed in U.S. Pat. No. 4,593,358 patented to S. Takeshima et al., a well-known power steering apparatus is arranged such that a plurality of control characteristics between the automobile speed and a rotational frequency of an oil pump are prepared,, and one of these control characteristics is selected, depending on the conditions of streets of cities or towns and mountain roads This type of apparatus is capable of varying the characteristics existing between manual steering torque and steering output torque by changing the assist force in accordance with not only the difference between the automobile speeds but also the difference between the road conditions.

However, there arise some problems in which the traveling condition of the automobile varies according to a feeling and a character of the driver in addition to the automobile speed and the road conditions, i.e., the traveling condition depends on whether the driver drives the car aggressively or moderately. This steering force which is suited to the operating condition determined by the driver cannot be obtained in the prior art.

In order to obviate the above-described problems, a method of determining the steering force taking the driving conditions as well as the road conditions into consideration has been proposed, which is disclosed in U.S. patent application Ser. No. 06/946,050, now U.S. Pat. No. 4,773,498, assigned to the assignees of the present invention. In the previously proposed invention, however, a driving condition index which exhibits the driving condition is calculated in the form of a numerical value on the basis of the automobile speed, and hence the steering force often varies in proportion to frequent changes in automobile speed according to traffic situations in which the automobile travels As a result, an unnatural feeling is imparted to the driver.

In order to improve driving feeling, the assignee of this invention have also proposed another method, which is disclosed in U.S. patent application Ser. No. 07/098,185. In this method, even if the driving condition index decreasing radically, the steering force is decreased at a constant rate so as to prevent a sudden decrease in the steering force, which gives an abnormal feeling to the driver In this proposed invention, however, the rated decrease of the steering force is set at a constant value. If the rate of decrease is set at a constant value which gives good feeling to the driver at the low speed driving, the driver feels that it takes too long to decrease the steering force during high speed driving, at which time the driver is under duress. Therefore, the slow decrease of the steering force gives an incompatible feeling to the driver at the high speed driving. The same problems arise when either the height of the automobile or the characteristic of the suspension is controlled depending on the driving condition of the driver.

SUMMARY OF THE INVENTION

Accordingly, it is a primary object of the present invention to provide a device for detecting driving conditions which is also capable of controlling devices, such as a power steering apparatus in an automobile in accordance with the driving conditions, and particularly of providing a natural feel to the driver both at low speeds and at high speeds.

According to one aspect of the invention, there is provided a device for detecting the driving conditions which is capable of varying the maximum change rate of the driving condition index, and which is used for controlling devices having a condition which is related to the speed of the automobile.

To be specific, the driving condition detecting device is arranged such that the driving condition index exhibiting a driving condition is computed on the basis of the values of automobile speed transmitted from an automobile speed sensor or the plurality of update information on the automobile speed, and the limit value exhibiting a maximum change rate is computed on the basis of the automobile speed. A correcting means compares the change amount of the driving condition index, for a predetermined time period, with the limit values. Hence, if the change in the index exceeds the limit value, the index is changed so that the change amount of the index becomes the same as the limit value.

With this arrangement, it is feasible to control the devices such as a power steering apparatus with the driving condition index, while the change rate of the index does not exceed the limit value set. This limit value depends on the automobile speed.

Accordingly, even if the driving condition varies radically according to the traffic situations, the detected driving condition is moderated. Furthermore, the driving condition can be detected so that the driving condition index changes slowly during low speed operation, at which time the mental stress is reduced and changes rapidly during high speed operation, at which time the mental stress of the driver is increased. Accordingly, it becomes possible to give a natural feeling to the driver at both low speed traveling and high speed traveling.

BRIEF DESCRIPTION OF THE DRAWINGS

Other objects and aspects of the invention will become apparent from the following description of embodiments with reference to the accompanying drawings in which:

FIGS. 8(a) through 8(c) are graphic charts each showing variations in driving condition indices, and correction driving condition indices during both low speed and high speed;

FIGS. 14(a) through 14(c) are graphs which each a variation in the first driving condition index, and correction driving condition indices under low speed traveling and high speed traveling.

DESCRIPTION OF THE PREFERRED EMBODIMENTS

Figure 1:
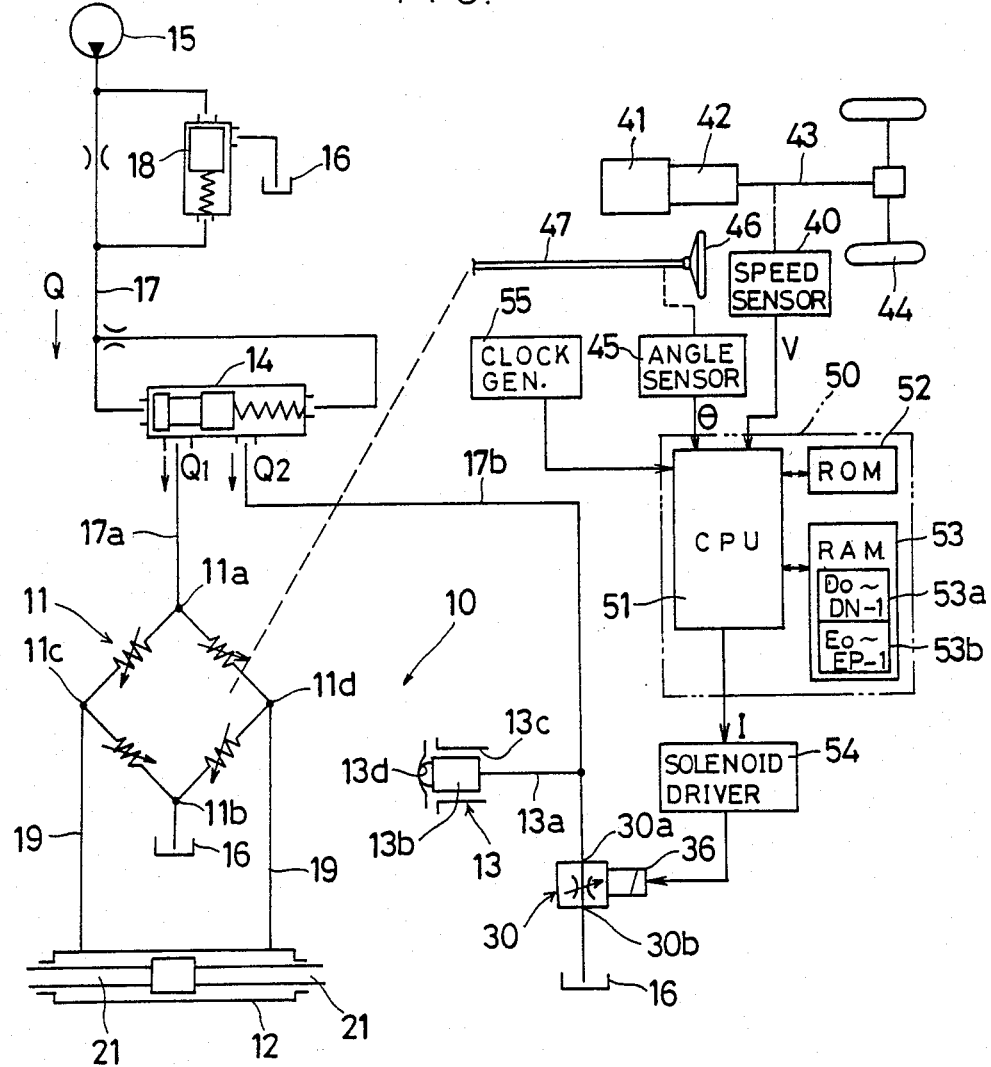
FIG. 1 is a block diagram schematically illustrating a power steering system equipped with a device for detecting the driving condition according to the present invention.

Referring now FIG. 1, there is shown a rack-and-pinion type power steering apparatus indicated generally at 10 which is composed of a servo valve 11 connected through a handle shaft 47 to a steering handle 46, a power cylinder 12 connected through a not illustrated link mechanism in a piston rod 21 to front wheels and a reaction mechanism 13 incorporated into the servo valve 11.

A bypass valve 18 is built in a supply pump 15 such as a vane pump driven by an engine 41 of an automobile. With this arrangement, a working fluid having a constant flow rate Q is supplied via a discharge passage 17 to a flow distributing valve 14. This flow distributing valve 14 serves to distribute the working fluid having the constant flow rate Q to a servo valve passage 17a and to a reaction control passage 17b. In this case, the two streams of working fluid—one having a constant flow rate Q2 and the other having a constant flow rate Q2—are imparted to these passages 17a and 17b. The servo passage 17a is connected via the servo valve 11 to the power cylinder 12, while the reaction control passage 17b is connected to the reaction mechanism 13 and to an electromagnetic control valve 30.

The servo valve 11 involves the use of a wellknown rotary type valve. This servo valve 11 is provided between the power cylinder 12 and a supply pump 15. The servo valve is operated immediately when undergoing manual steering torque applied from the steering handle 46 via the handle shaft 47 to an input shaft 20 of the servo valve 11. The servo valve 11 also serves to generate an assist force by controlling the supply and discharge of the working fluid to and from two chambers of the power cylinder 12, whereby the incremented steering output torque is conveyed from the piston rod 21 of the power cylinder 12 to the front wheels. The already used working fluid is returned to a reservoir 16 where the fluid is sucked by the pump 15 once again.

The reaction mechanism 13 is a well-known type and is essentially composed of: a plunger 13b fitted in a pair of insertion holes 13c formed in an output shaft of the rotary type servo valve 11 and extending in the radial direction; and a V-shaped oblique surface 13d inclined to both sides of the peripheral direction, the oblique surface 13d being provided on the input shaft to engage with the tip of the plunger 13b. This reaction mechanism 13 is arranged in such a way that a pressure of the working fluid introduced via a port 13a into the rear portion of the plunger 13b is varied by the electromagnetic control valve 30 with the result that torsion spring characteristics between the input shaft 20 and the output shaft 22 are changed, and working characteristics of the servo valve 11 with respect to the input torque, viz., the manual steering torque, are thereby varied to change the steering characteristics.

Tangible constructions and operations of the foregoing servo valve 11, the power cylinder 12 and the reaction mechanism 13 have been described in detail in U.S. patent application Ser. No. 06/865,337 which was assigned to the same assignee as the one of the present application. Such relevant description is therefore incorporated in this application.

Figure 2:
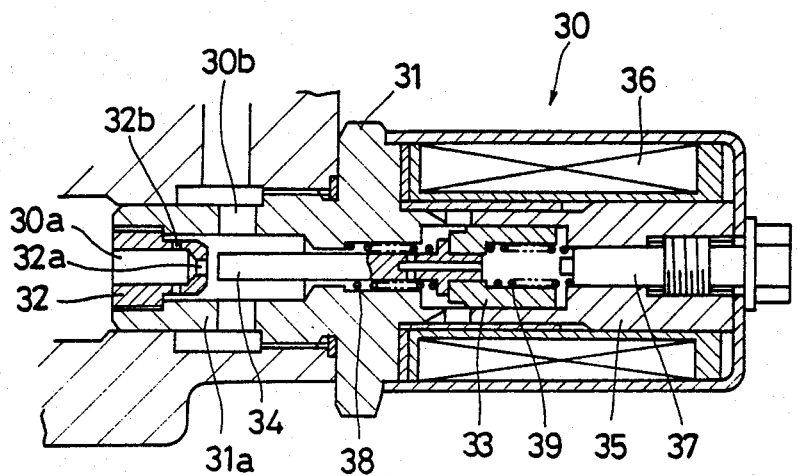
FIG. 2 is a cross-sectional view of a electromagnetic control valve.

Referring now to FIG. 2, a union 32 having a orifice 32a is coaxially secured to the end of a projection portion 31a of a valve body 31 which is a part of the electromagnetic control valve 30, and a first port 30a and a second port 30b are provided on both sides of the orifice 32a. A spool 33 securing a valve shaft 34 is fitted in a hole of yoke 35 secured on the valve body 31 in such a way that the spool 33 is axially slidable on the central axis of the projection portion 31a. The spool 33 and the valve shaft 34 are elastically supported between the valve body 31 and an adjustment bolt secured to yoke 35 via springs 38 and 39.

With this arrangement, the end portion of the valve shaft 34 is far from the orifice 32a of the union 32 when no electric current is applied to the solenoid 36, whereby the orifice 32a is fully opened. When the electric current is applied to the solenoid 36, the spool 33 is moved leftward according as the value of electric current, whereby the amount of opening at the orifice 32a is gradually diminished, and the orifice 32a is ultimately closed. In the state of fully closed, the port 30a and 30b are connected to each other via a narrow fixed orifice 32b. The electromagnetic control valve 30 is secured to the valve housing of the power steering apparatus by screwing on the projection portion 31a of the valve body 31.

Figure 3A:
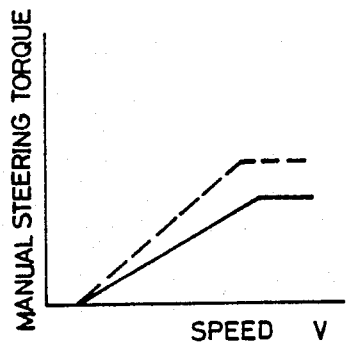
FIGS. 3(A) and 3(B) are graphic charts each showing variations in manual operation torque with respect to a automobile speed and a steering angle.
Figure 3B:
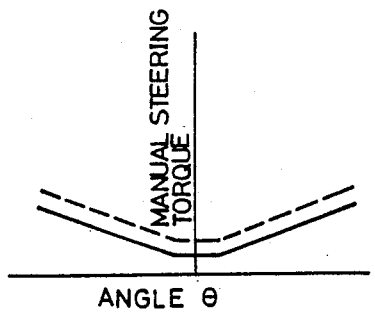

In the above-described power steering apparatus, where the amount of opening (hereinafter simply referred to as opening) of the variable throttle of the electromagnetic control valve 30 is arranged to be small in proportion as the automobile speed increases, the manual steering torque characteristically, as depicted with a solid line in FIG. 3(A), becomes heavy in proportion to an increase in automobile speed, and similarly the same torque, as depicted with the solid line if FIG. 3(B), becomes heavy in proportion to an increase in steering angle. Under such control, however, even if the driving conditions, such as aggressive driving or moderate driving or the road conditions on city streets or on mountain roads vary, the above-described characteristics remain invariable. In this embodiment, the opening of the electromagnetic control valve 30 is changed by an electronic control unit 40 illustrated in FIG. 1 in accordance with a road condition index and a correction driving index which will be discussed below, as well as the automobile speed, thereby changing the characteristics which depend on the driving conditions and the road conditions.

As shown in FIG. 1, the electronic control unit 50 essentially consists of a microprocessor (hereinafter simply referred to as CPU) 51, a read-only memory (hereinafter simply referred to as ROM) 52 and a random access memory (hereinafter simply referred to as RAM) 53. The CPU 51 which is connected through a solenoid driving circuit 54 to a solenoid 36 of the electromagnetic control valve 30 functions to control the electric current applied to the solenoid 36. The CPU 51 is further connected through a not illustrated interface to a car speed sensor 40 and a steering angle sensor 45. The car speed sensor 40 is constituted by a tachometer linked to an output shaft 43 of a transmission 42 for transmitting the driving force of the engine 41 to the rear wheels. The tachometer serves to detect automobile speed v on the basis of a frequency of a pulse signal generated from the car speed sensor 40. The steering angle sensor 45 consists of a rotary plate fixed to, for instance, the handle shaft 47, a pair of photo-interruptors and a phase judging circuit. This steering angle sensor 45 serving to detect a steering angle $\theta$ of the steering handle 46.

Figure 6A:
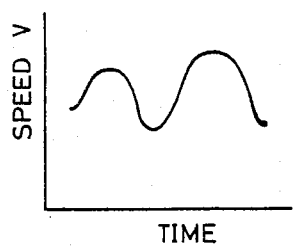
FIGS. 6(A) through 6(F) are graphic charts each showing variations in automobile speed, acceleration and absolute value of the acceleration under two driving conditions.
Figure 6B:
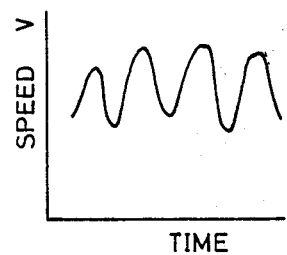
Figure 6C:
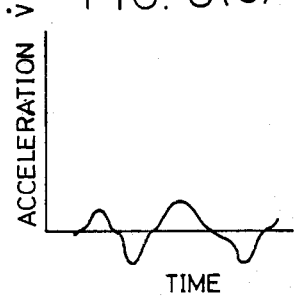
Figure 6D:
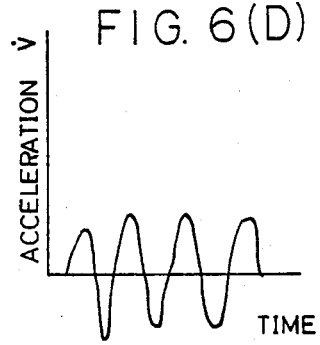
Figure 6E:
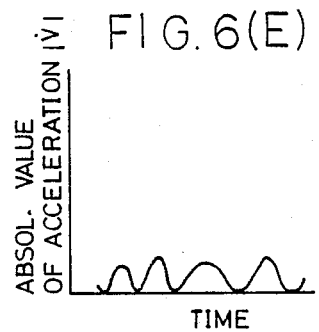
Figure 6F:
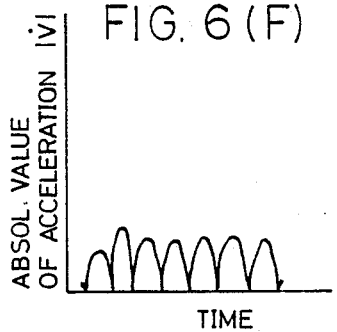

In the case of the moderate driving, the rate at which the automobile speed varies is, as illustrated in FIG. 6(A), relative small. In the case of the aggressive driving, however, the rate at which the automobile speed varies is, as illustrated in FIG. 6(B), relatively large. Consequently, a variation curve of an acceleration $\dot{v}$ of the automobile, as shown in FIG. 6(C), depicts a small number of undulations with small amplitude differences, whereas the variation curve in the case of the aggressive driving, as shown in FIG. 6(D), depicts more undulations with large amplitude differences. An absolute value $|\dot{v}|$ of the acceleration, as illustrated in FIG. 6(E), indicates several undulations which are small in height in the case of the moderate driving. While on the other hand, the line of the absolute value, as illustrated in FIG. 6(F), provides a large number of high undulations in the case of the aggressive driving. Consequently, where an integral value of the absolute value $|\dot{v}|$ of the acceleration within a given period is employed as it is or after slightly modifying it to serve as a first driving condition index $J_{11}$, this index $J_{11}$ decreases during moderate driving, whereas the index increases during aggressive driving. From this phenomenon, it is possible to know whether the moderate driving or the aggressive driving is effected.

The first driving condition index, changes with respect to the time in such a manner as depicted with the curve $J_{11}$ in FIG. 8(a), is converted into a second driving condition index $J_{12}$ which takes any one of three values $J_l$, $j_m$ and $j_h$ (the three values imply the numerical values 0, 50 and 99, respectively in this embodiment) based on three judgment levels L, M and H (three levels imply the numerical values 13, 38 and 57, respectively in this embodiment). Subsequent to this step, the correcting means further converts the second driving condition index $J_{12}$ into a correction driving condition index $J_{1a}$. Namely, the second driving condition index $J_{12}$ is, as depicted with the polygonal line $J_{12}$ in FIG. 8(a), characterized such that: the second driving condition index $J_{12}$ is shifted to $j_m$ when the second driving condition index $J_{12}$ takes $J_l$ and the first driving condition index $J_{11}$ exceeds the judgment level M; the second driving condition index $J_{12}$ is shifted to $j_h$ or $j_l$ when the second driving condition index $J_{12}$ is $j_m$ and the first driving condition index $J_{11}$ becomes greater than the judgment level H (or smaller than the level L); and the second driving condition index $J_{12}$ is shifted to $j_m$ when the second driving condition index $J_{12}$ is $j_h$ and the first driving condition index $J_{11}$ becomes the judgment level M or less.

The second driving condition index $J_{12}$ is converted into the correction driving condition index $J_{1a}$. The correction driving condition index $J_{1a}$, as shown in FIGS. 8(B) and 8(C), takes any one of three values, $J_l$, $J_m$ and $J_h$ in the same way as the second driving condition index $J_{12}$. However, where the second driving condition index $J_{12}$ changes, the correction driving condition index $J_{1a}$ approximates to the second driving condition index $J_{12}$ at a change velocity, which varies according to the automobile speed. The change speed increases according to the increment of the automobile speed. The change speed, at the time when the second driving condition index $J_{12}$ increases is higher when the second driving condition index $J_{12}$ decreases, at the same automobile speed.

Next, the frequency of the steering angle will be described. The automobile encounters more intersections where it has to turn at a right angle but encounters less curves on city streets. As a result, the steering frequency in a middle steering angle position is relative small. On the occasion of traveling on mountain roads, there are more curves but less orthogonal points, and hence the steering frequency in the middle steering angle position is relatively large. A frequency distribution of the absolute value $|\theta|$ of a steering angle $\theta$ within a predetermined period is created, and a value of frequency in the middle steering angle position K (corresponding to the traveling on the moderately curved roads) is obtained. Where a value obtained by dividing this frequency value by the total number of frequencies or a slightly modified value is employed as the road condition index $J_2$, this index $J_2$ becomes small in the case of traveling on city streets shown in FIG. 7(B) but becomes large in the case of traveling on the mountain roads shown in FIG. 7(A). From this variation in the index $J_2$, it is possible to distinguish the conditions of city streets from those of the mountain roads.

The ROM 52 stores control characteristics with respect to the car speed v and the steering angle o of the control current applied to the solenoid 36 of the electromagnetic control valve 30. These control characteristics are, as shown in FIGS. 4(A) through 4(D), composed of four characteristics maps $A_1$, $A_2$, $A_3$ and $A_4$. The characteristic map $A_1$ exhibits variational characteristics of a first control current value $i_1$ to be applied to the solenoid 36 in accordance with variations in the automobile speed v and in the steering angle e when the correction driving condition index $J_{1a}=0$ ($=j_l$) (moderate driving condition) and the road condition index $J_2=0$ (traveling on the streets of cities where the automobile encounters few corners at the intersections). In the characteristic map $A_1$, the current value $i_1$ is set to increase at a specified rate within given ranges ($\theta_1 < \theta < \theta_2$, $v_1 < v < v_2$) with respect to increments in the automobile speed v and in the steering angle e but is set so as not to vary beyond the above-described ranges. The characteristic map $A_4$ shows variational characteristics of a fourth control current value $i_4$ to be applied to the solenoid 36 in accordance with the changes in the automobile speed v and in the steering angle $\theta$ when the correction driving condition index $J_{1a}=99$ $(=j_h)$ (aggressive driving condition) and the road condition index $J_2=99$ (traveling on the mountain roads having many curvatures). In this characteristic map $A_4$, the current value $i_4$ is set to increase in proportion to the increments in the automobile speed v and in the steering angle $\theta$ as in the case of the first control current value $i_1$ but is set so as to be considerably larger than current value $i_1$ on the whole. The characteristic maps $A_2$ and $A_3$ respectively show the variational characteristics of a second control current value $i_2$ when $J_{1a}=99$ and $J_2=0$ and of a third control current value $i_3$ when $J_{1a}=0$ and $J_2=99$. In either case, the second and third control current values vary corresponding to the increments both in the automobile speed v and in the steering angle $\theta$ as in the case of the foregoing values $i_1$ and $i_4$. These values, however, fall within a range of $i_1$ to $i_4$.

The ROM 52 also stores characteristic maps defining the maximum amount of change speed of the correction driving condition index $J_{1a}$. These characteristic maps are composed of: a characteristic map $B_1$ which exhibits variational characteristics of the increase limit value $X_1$ which defines maximum change rate per a predetermined time period T of the correction driving condition index $J_{1a}$ when the correction driving condition index $J_{1a}$ increases; and characteristic map $B_2$ which exhibits variational characteristics of the decrease limit value $X_2$ which defines maximum change rate of the correction index $J_{ia}$ when the correction driving condition index $J_{1a}$ decreases. The limit values $X_1$ and $X_2$ are so set as to increase according to the increase of the automobile speed, and the increase limit $X_1$ is so set as to be considerably larger than decrease limit $X_2$ on the whole.

Figure 10:
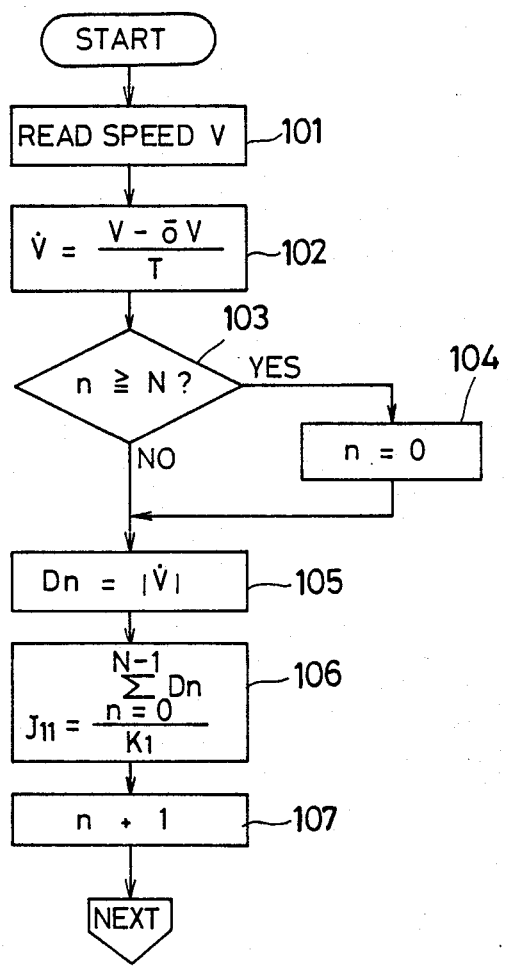
FIGS. 10(A) and 10(B) are flowcharts in combination showing a step I of the program of FIG. 9.
Figure 10:
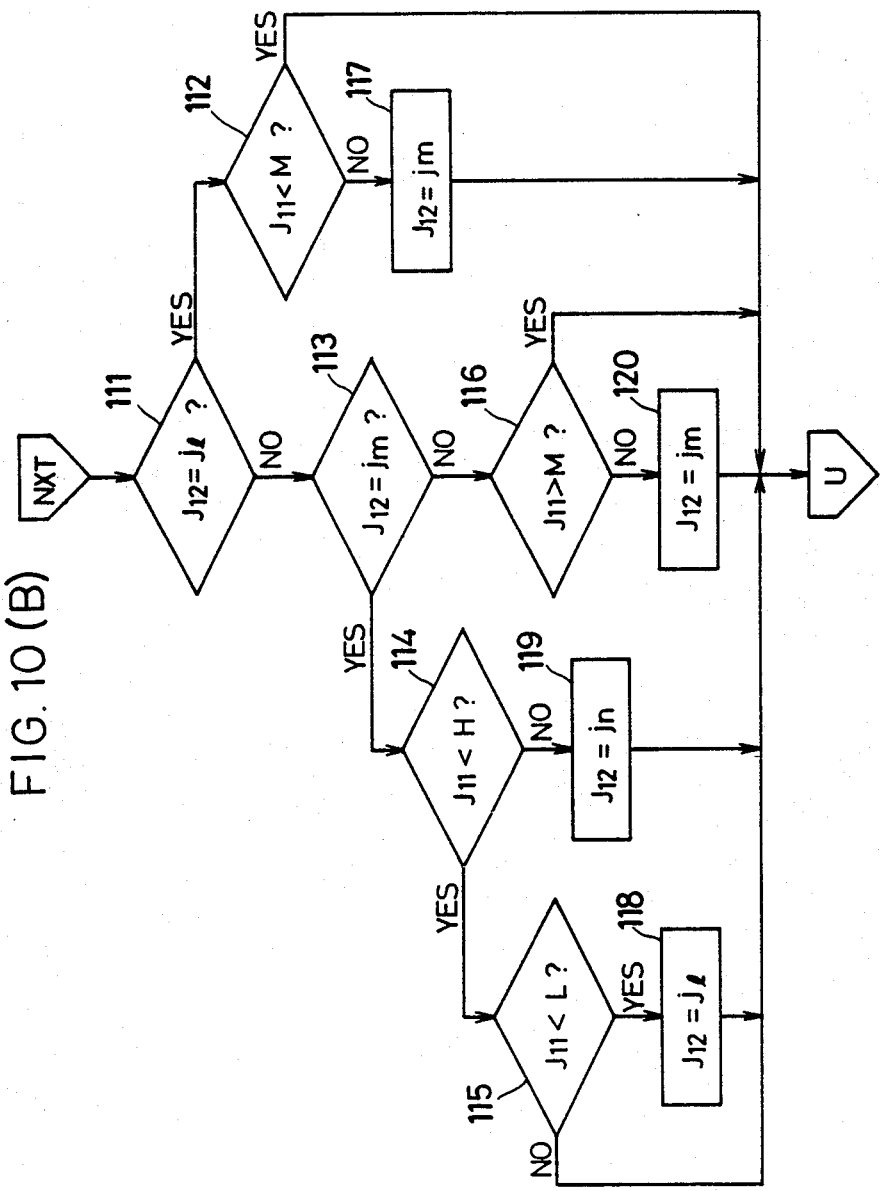
Figure 11:
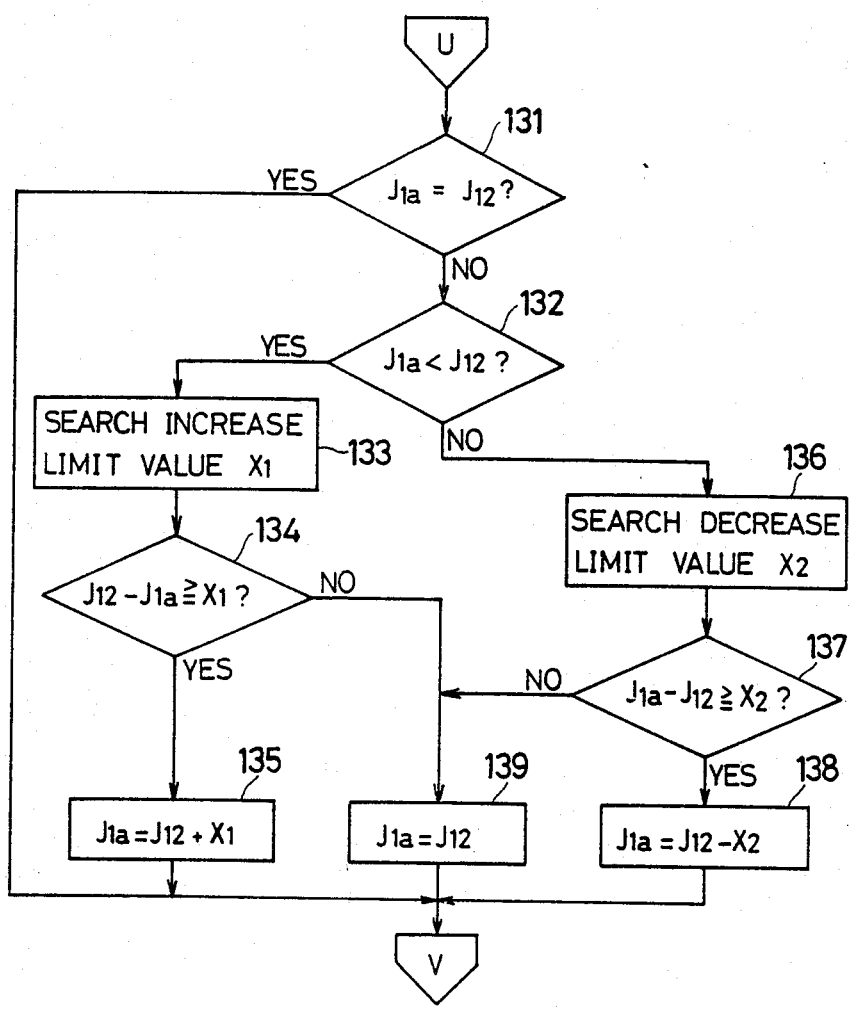
FIG. 11 is a flowchart fully showing a step II of the program of FIG. 9.

The RAM 53 incorporates a multiplicity (N-pieces) of buffer registers $D_0$ to $D_{N-1}$ for computing the first driving condition index $J_{11}$. The CPU 51 causes the buffer registers $D_0$ to $D_{N-1}$ to sequentially store the absolute values $|\dot{v}|$ of the acceleration $\dot{v}$ at predetermined time intervals T. In this case, the acceleration value $\dot{v}$ is given by:

$$\dot{v}=(v-\overline{O}v)/T \tag{1}$$

where $\overline{O}v$ is the automobile speed which has previously been read. Whenever the absolute value $|\dot{v}|$ is stored in the last buffer register $D_{N-1}$, the CPU 51 permits the first buffer register $D_0$ to launch into storage to update the contents of storage. The CPU 51 computes a sum of the values stored in the buffer registers $D_0$ to $D_{N-1}$, i.e., the integral value $J_{11}$ in conformity with the following equation (2).

$$J_{11} = \sum_{n=0}^{N-1} D_n/K_1 \tag{2}$$

where $K_1$ is the constant (this constant is experimentally set to establish this relation $J_{11}\approx 99$ in the aggressive driving). In this case, the thus obtained integral value $J_{11}$ is defined as the first driving condition index. A control program shown in the flowchart of FIG. 10(A) is prepared for effecting this kind of arithmetic, with the control program being stored in the ROM 52. The CPU 51 converts the thus computed first driving condition index $J_{11}$ into the second driving condition index $J_{12}$ which, as explained earlier, varies at the three levels, and then converts the second driving condition index $J_{12}$ to the correction driving condition index $j_{1a}$. The control programs shown in the flowcharts of FIGS. 10(B) and 11 are prepared for performing this conversion. These programs are stored in the ROM 52.

Figure 12:
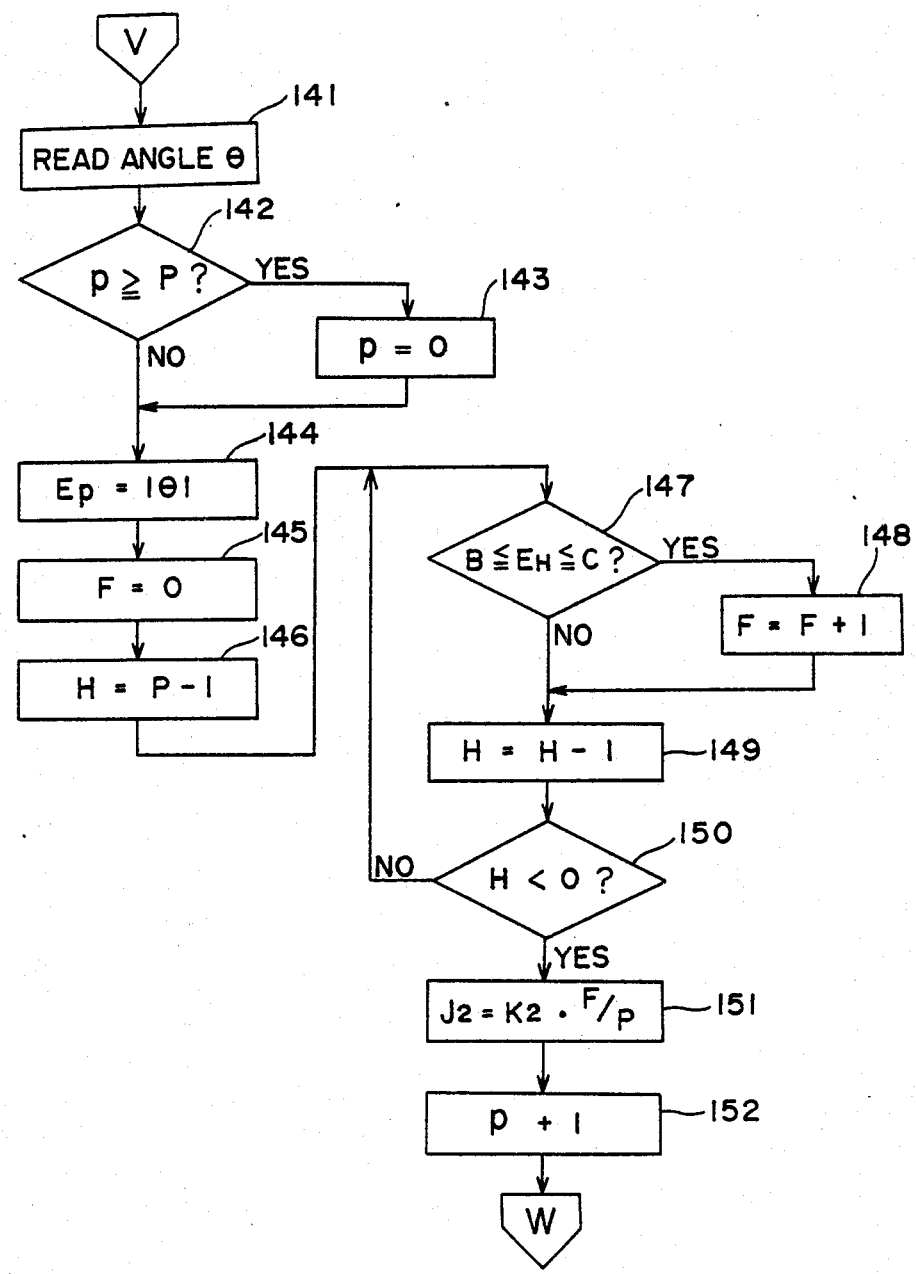
FIG. 12 is a flowchart fully showing a step III of the program of FIG. 9.

The RAM 53 is equipped with a multiplicity (P-pieces) of buffer register $E_0$ to $E_{p-1}$ for the purpose of computing the road condition index $J_2$. The CPU 51 causes the buffer registers $E_0$ to $E_{p-1}$ to sequentially store the steering angles e at the predetermined time intervals T. Every time the last buffer register $E_{p-1}$ has finished a storing interval, the CPU 51 permits the first buffer register $E_0$ to resume the storage to update the contents thereof. From the contents stored in the buffer registers $E_0$ to $E_{p-1}$ the CPU 51 computes a frequency F in a range which excludes the steering angles $\theta$ which exhibit the vicinities of a neutral position (small steering angle position) and of a terminal position (large steering angle position), i.e., within the middle steering angle position K shown in FIGS. 7(A) and 7(B). The CPU 51 further computes the road condition index $J_2$ by the formula (3).

$$J_2=K_2\cdot F/P \tag{3}$$

where $K_2$ is the constant (the constant is experimentally set to establish this relation $J_2\approx 99$ in the mountain roads having many curves). The control program shown in the flowchart of FIG. 12 is then prepared. This program is stored in the ROM 52.

Figure 4A:
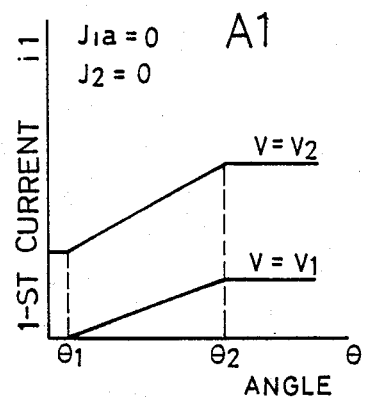
FIGS. 4(A) through 4(D) are graphic charts each showing a control current characteristic map in which control current values corresponding to the steering angles and the automobile speeds under four traveling conditions are determined.
Figure 4B:
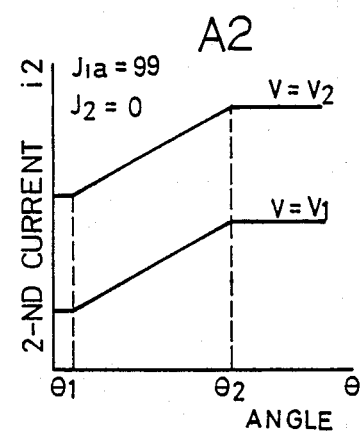
Figure 4C:
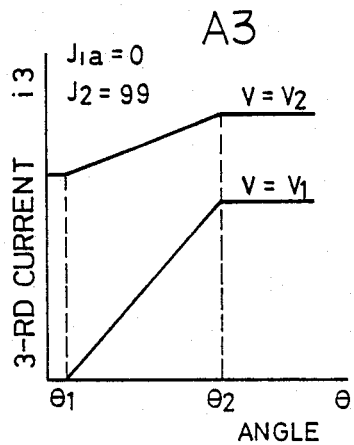
Figure 4D:
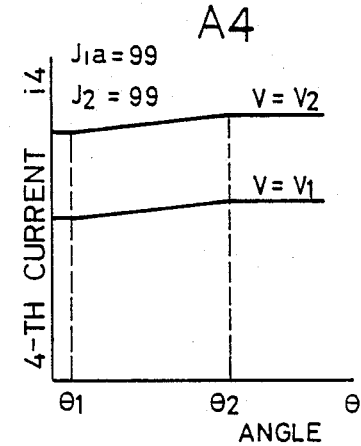
Figure 5:
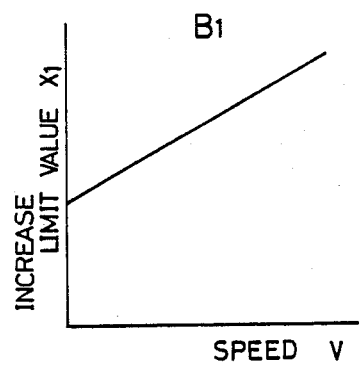
FIGS. 5(A) and 5(B) are graphic charts each showing variations in the increased limit value and in the decreased limit value corresponding to the car speed.
Figure 5:
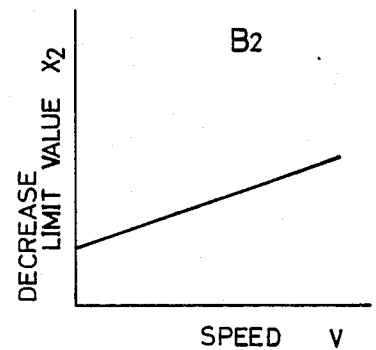

The CPU 51 fetches a first intermediate current value $I_1$ to be applied to the solenoid 36 of the electromagnetic control valve 30 in the case of traveling on city streets from the first and second control current characteristic maps $A_1$ and $A_2$ shown in FIGS. 4(A) and 4(B) on the basis of the correction driving condition index $J_{1a}$ (which varies at the three levels), the steering angle $\theta$ and the automobile speed at the present time. The CPU 51 similarly fetches a second intermediate current value $I_2$ to be applied to the electromagnetic control valve 30 when traveling on the mountain roads from the third and fourth control current characteristic maps $A_3$ and $A_4$ shown in FIGS. 4(C) and 4(D). Subsequent to this step, the CPU 51 inputs the road condition index $J_2$ and computes the control current value I which is so applied to the solenoid 36 as to correspond to the traveling condition at the present time from the first and second intermediate current values $I_1$ and $I_2$ by the following formula (4).

$$I=(I_2-I_1)\cdot J_2/100+I_1 \tag{4}$$

Figure 13:
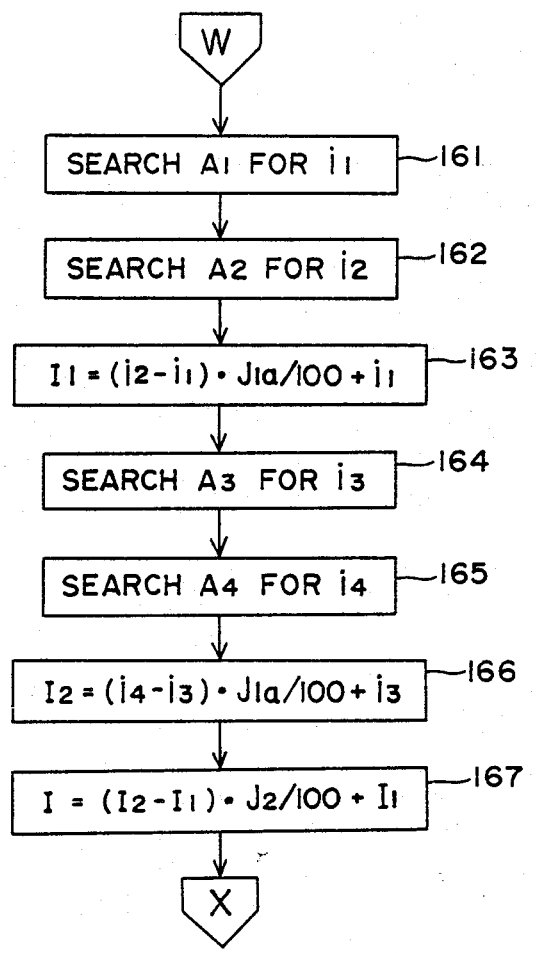
FIG. 13 is a flowchart showing a step IV of the program of FIG. 9.

The program shown in the flowchart of FIG. 13 is prepared for effecting this arithmetic, with the program being stored in the ROM 52. In the next step, a control electric current having this value I is applied to the solenoid 36 of the electromagnetic control valve 30 by means of the CPU 51.

When the two indices $J_{1a}$ and $J_2$ become large, the output control current value I applied to the solenoid 36 is augmented, and hence the opening of the electromagnetic control valve 30 is diminished. As a result, a pressure introduced into the reaction mechanism 13 grows, and the manual steering torque with respect to the automobile speed v and the steering angle $\theta$ are, as depicted with the broke lines in FIGS. 3(A) and 3(B), varied in the augmenting direction.

Next, the operation of the first embodiment will hereinafter be described.

Figure 9:
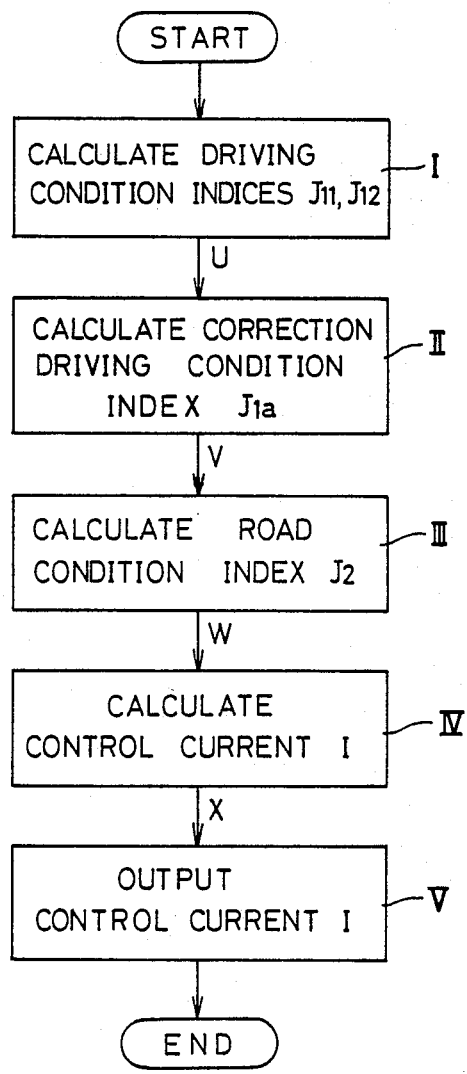
FIG. 9 is a flowchart schematically showing a system program executed by a microprocessor.

As illustrated in FIG. 9, the process executed by the CPU 51 is roughly classified into: an arithmetic process I of the driving condition indices $J_{11}$ and $J_{12}$; an arithmetic process II in which the driving condition index $J_{12}$ is converted into the correction driving condition index $J_{1a}$; an arithmetic process III of the road condition index $J_2$; an arithmetic process IV of the output control current value I; and a control current output process V. These processes are executed in due course.

Immediately when turning ON a main switch of the automobile, the electronic control unit 50 sets each variable to a predetermined initial value (for instance, the initial value of $J_{12}$ is $j_m$). The automobile speed sensor 40 and the steering angle sensor 45 detect the automobile speed v and the steering angle $\theta$ which momentarily vary according to the condition under which the automobile travels. The values which have now been detected are individually stored in registers (not illustrated). The CPU 51 executes a series of processes based on the control programs every time interruption signals are inputted at every preset time interval T (for instance, 0.5 second) from a clock generation circuit 55.

(I) Arithmetic Process of the Driving Condition Indices $J_{11}$ and $J_{12}$

To start with, the CPU 51 reads the automobile speed v stored in the above-described present value registering a step 101 shown in FIG. 10(A), and computes the acceleration $\dot{v}$ by differentiating the automobile speed v in accordance with the formula (1) in the next step 102.

In the subsequent step 103, the CPU 51 compares a sampling counter value n with the number N of the buffer registers $D_0$ to $D_{N-1}$. If $n \geq N$ is not valid, the process of the CPU 51 goes to a step 105 directly so that CPU 51 causes the n-th buffer register $D_n$ designated by the sampling counter value n to store the absolute value $|\dot{v}|$ of acceleration.

If $n \geq N$ is valid, however, the CPU 51 executes the same process in the step 105, after resetting the sampling counter value n to 0 in a step 104. The sampling counter value n is incremented by 1 at a step 107. With this arrangement, the CPU 51 permits the N-pieces buffer registers $D_0$ to $D_{N-1}$ to sequentially store the detected absolute values $|\dot{v}|$ of acceleration at the predetermined time intervals T in the steps 103 through 105. The CPU 51 also operates to reset the sampling counter value n after storing the absolute values in all the buffer registers $D_0$ to $D_{N-1}$ so as to repeat the sequential storing processes from the first buffer register $D_0$. Because of this updating process, the N-pieces of absolute values $|\dot{v}|$ of acceleration during a period of the latest predetermined time T·N are stored in the buffer registers $D_0$ to $D_{N-1}$.

In a step 106, the CPU 51 reads out the contents stored in all the buffer registers $D_0$ to $D_{N-1}$ and then computes the first driving condition index $J_{11}$ by the formula (2). Thereafter, the CPU 51 converts the first driving condition index $J_{11}$ to the second driving condition index $J_{12}$ with processes shown in FIG. 10(B).

In the flowchart of FIG. 10(B), if $J_{12}=j_l$ and $J_{11}<M$, the CPU 51 goes through steps 111 and 112, and executes the arithmetic process II. If $J_{12}=j_l$ and $J_{11}\geq M$, the CPU 51 goes through the steps 111 and 112, and converts the second driving condition index $J_{12}$ into $j_m$ in a step 117. Thereafter, the CPU 51 performs the arithmetic process II. If $J_{12}\neq j_l$, $J_{12}=j_m$, Jhd 11 $<$H and $J_{11}>L$, the CPU 51 passes through steps 111 and 113 to 115, and puts the process forward to the arithmetic process II. If $J_{12}\neq j_l$, $J_{12}=j_m$, $j_{11}<H$ and $J_{11}<L$, the CPU 51 goes through the steps 111 and 113 to 115, and converts the second driving condition index $J_{12}$ into $j_l$ in a step 118. Thereafter, the CPU 51 puts the process forward to the arithmetic process II. If $J_{12}\neq j_l$, $J_{12}=j_m$ and $J_{11}\geq H$, the CPU 51 goes through the steps 111, 113 and 114 and converts the second driving condition index $J_{12}$ into jh in a step 119. Thereafter, the CPU 51 executes the arithmetic process II. If $J_{12}\neq j_l$, $J_{12}J_m$, and $J_{11}>M$, the CPU 51 passes through the steps 111, 113 and 116, and moves directly to the arithmetic process II. If $J_{12}\neq j_l$, $J_{12}\neq j_m$ and $J_{11}\geq M$, the CPU 51 passes through the steps 111, 113 and 116, and converts the second driving condition index $J_{12}$ into $j_m$ in a step 120. Thereafter, the CPU 51 moves the arithmetic process II. To summarize the processes of the abovedescribed steps 111 through 120, the CPU 51 maintains the second driving condition index $J_{12}$ when the fluctuations in the first driving condition index $J_{11}$ fall within a predetermined range. If such fluctuations go beyond the predetermined range, the CPU 51 shifts the second driving condition index $J_{12}$ to any one of the three level values $j_l$, $j_m$ and $j_h$. After these processes, the CPU 51 executes the arithmetic process II.

(II) Arithmetic Process of the Correction Driving Condition Index $J_{1a}$

In a first step, the CPU 51 compares the correction driving condition index $J_{1a}$ with the second driving condition index $J_{12}$ calculated by the arithmetic process I in a step 131 shown in FIG. 11. If $J_{1a}=J_{12}$, the CPU 51 goes through the step 131 and executes the next arithmetic process III. If $J_{1a}\neq J_{12}$ and $J_{1a}<J_{12}$, the CPU 51 goes through steps 131 and 132, and searches in step 133 a increase limit value $X_1$ from the characteristic map $B_1$ stored in the ROM 52 which depends on the automobile speed v. Thereafter, if $J_{12}-J_{1a}\geq X_1$, the CPU 51 goes to a step 135 via a step 134 so as to convert the correction driving condition index $J_{1a}$ into a value calculated by $J_{12}+X_1$, and then executes the arithmetic process III. If it is confirmed that $J_{1a}<J_{12}$ is not valid in the step 132, the CPU 51 goes to a step 136, and searches a decrease limit value $X_2$ from the characteristic map $B_2$ in the ROM 52 depend on the current automobile speed v. Thereafter, if $J_{1a}J_{12}\geq X_2$, the CPU 51 goes to a step 138 via step 137 so as to convert the correction driving condition index $J_{1a}$ to a value calculated by $J_{12}-X_2$, and then executes the arithmetic process III. If $J_{12}-J_{1a}<X_1$ or $J_{1a}-J_{12}<X_2$, the CPU 51 goes to a step 139 from the steps 134 or 137 so as to convert the correction driving condition index $J_{1a}$ into the same value as the second driving condition index $J_{12}$. Thereafter, the CPU 51 executes the arithmetic process III.

Owing to this process, the second driving condition index $J_{12}$ is converted to the correcting driving condition index $J_{1a}$ in such a way that the change amount for the time interval T of the second driving condition index $J_{12}$ is limited to the limit values $X_1$ or $X_2$ when the change amount for the time interval T exceeds the limit values $X_1$ or $X_2$ searched, depending upon the automobile speed.

(III) Arithmetic Process of the Road Condition Index $J_2$

To begin with, the CPU 51 reads the steering angle $\theta$ stored in the present value register in a step 141 shown in FIG. 12, and compares a sampling counter value p with the number P of the buffer register $E_0$ to $E_{p-1}$. If $p\geq P$ is not valid, the CPU 51 goes to a step 144 directly, but if $p\geq P$ is valid, the CPU 51 goes to a step 144 after resetting the sampling counter value p to 0 in a step 143. In the step 144, the CPU 51 makes the p-th buffer register $E_p$ designated by the value p store the absolute value $|\theta|$ of steering angle in a step 144.

Thereafter, the sampling counter value p is incremented by 1 at a step 152. With this arrangement, the CPU 51 sequentially modifies addresses of the buffer registers $E_0$ to $E_{p-1}$ every time it reads the steering angles $\theta$ from the present value register, whereby the predetermined number of the latest absolute values $|\theta|$ of steering angle are stored in the buffer registers $E_0$ to $E_{p-1}$. The CPU 51 subsequently sets a frequency counter value F to 0 in a step 145, and further sets a value obtained by subtracting 1 from the number P of the buffer registers, this value being defined as an initial value of a readout counter value H in a step 146.

Figure 7A:
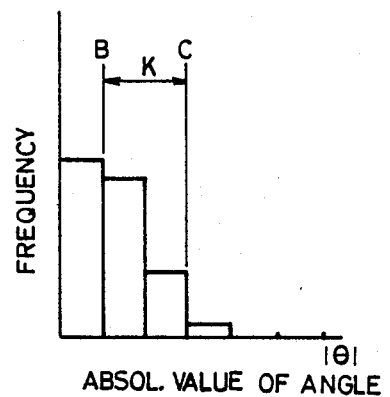
FIGS. 7(A) and 7(B) are histograms each showing a frequency distribution of the absolute values of the steering angle under two road conditions.
Figure 7B:
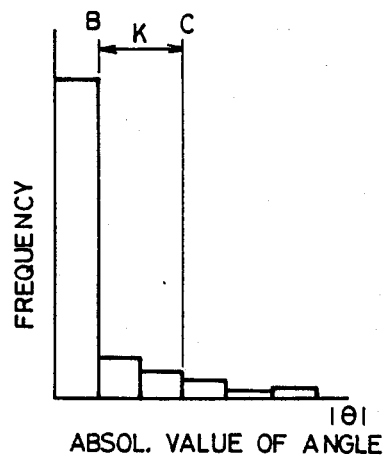

The CPU 51 compares values of the H-th buffer register $E_H$ with two set values B and C in a step 147. The set values B and C are, as shown in FIGS. 7(A) and 7(B), defined as the upper and lower limit values of the absolute value within a range of the middle steering angle position corresponding to the moderately curvilinear traveling. The CPU 51 adds 1 to the frequency counter value F in a step 148 when $B \leq E_H \leq C$. If $B \leq E_H \leq C$ is not valid, the CPU 151 moves directly to a step 149 to subtract 1 from a readout counter value H. The CPU 51 compares the readout counter value H H with 0 in a step 150, and repeats the processes described in the steps 147 through 149 until a relationship of $H<0$ is obtained. Then the frequency counter value F is arranged to be the number of steering operations which will satisfy $B \leq E_P \leq C$ in the buffer registers $E_0$ to $E_{p-1}$. When $H<0$, the CPU 51 moves to the next step 151.

In the step 151, the CPU 51 computes the road condition index $J_2$ by the formula (3) and then comes to the next arithmetic process IV relative to the control current value I.

(IV) Arithmetic Process of the Control Current Value I

At the onset, in a step 161 the CPU 51 searches a first control current value $i_1$ from the first control current characteristic map $A_1$ in the ROM 52 on the basis of the present automobile speed v and the steering angle $\theta$ which have been read in the steps 101 and 141. In a step 162 the CPU 151 likewise searches a second control value $i_2$ from the second control current characteristic angle $\theta$. In the subsequent step 163 the CPU 51 effects interpolation arithmetic of a first intermediate current value $I_1$ by substituting the first and second control current values $i_1$ and $i_2$ and the correction driving condition index $J_{1a}$ computed in the arithmetic processes II into the following formula.

$$I_1 = (i_2 - i_1) \cdot J_{1a}/100 + i_1$$

The first intermediate current value $I_1$ is defined as a control current value suitable for being applied to the electromagnetic control value 30 so as to correspond to the present automobile speed, the steering angle as well as the driving conditions on city streets having less curves.

In the following steps 164 through 166, the CPU 51 searches third and fourth control currents values $i_3$ and $i_4$ from the third and fourth control current characteristic maps $A_3$ and $A_4$ on the basis of the present automobile speed v and the steering angle $\theta$. Then the CPU 51 effects interpolation arithmetic of a second intermediate current value $I_2$ by substituting the third and fourth control current values $i_3$ and $i_4$ and the correction driving condition index $J_{1a}$ into the following formula.

$$I_2 = (i_4 - i_3) \cdot J_{1a}/100 + i_3$$

This second intermediate current value $I_2$ is defined as a control current value suitable for being applied to the electromagnetic control value 30 so as to correspond to the present automobile speed, the steering angle and the driving conditions in the case of mountain roads having many curves.

In a step 167, the CPU 51 computes the output control current value I by substituting the intermediate current values $I_1$ and $I_2$ and the road condition index $J_2$ obtained in the arithmetic process III into the foregoing formula (4). Subsequently, the CPU 51 moves to the next arithmetic process V. The output control current value I is a value appropriate for being applied to the electromagnetic control valve 30, corresponding to the present automobile speed, the steering angle, the driving conditions and the road conditions.

(V) Control Current Output Process

In the control current output process V shown in FIG. 9, the CPU 51 operates to apply the output control current value I computed in the step 167 to the solenoid 36 of the electromagnetic control valve 30. Upon completion of this process V, the CPU 51 executes all the programs shown in the flowcharts of FIGS. 9 to 13.

Whenever the interruption signals are outputted at every predetermined short time interval T, the CPU 51 repeatedly executes the programs described in the foregoing flowcharts, and further sets the opening of the electromagnetic control valve 30 to the optimum state in accordance with the automobile speed, the steering angle, the driving conditions and the road conditions. With this arrangement, it is feasible to acquire the optimum manual steering torque by changing over the steering characteristics. Consequently, the assist force of the power steering apparatus is reduced, when the correction driving condition index $J_{1a}$ and the road condition index $J_2$ become large. A rate of increase in the manual steering torque to the automobile speed and the steering angle, as depicted with the broke lines in FIGS. 3(A) and 3(B), varies in the increasing direction in proportion to increments in the above-described indices $J_{1a}$ and $J_2$.

As described above, even if the first driving condition index $J_{11}$ frequency fluctuates, the second correction driving condition index $J_{12}$ remains constant on the condition that the fluctuations fall within the predetermined range.

Moreover, the correction driving condition index $J_{1a}$ changes moderately even if the second driving condition index $J_{12}$ changes radically.

Hence, there will be no variation in steering force due to change-over of the steering characteristics, thereby giving no unnatural feeling to the driver.

In the first embodiment, the first driving condition index $J_{11}$ is converted into the second driving condition index $J_{12}$ taking any one of three levels, and then the correction driving condition index $J_{1a}$ is calculated based on the second driving condition index $J_{12}$. However, it is possible to calculate the correction driving condition index $J_{1a}$ directly from the first driving condition index $J_{11}$ by a similar compensation process In this case, the control program depicted with the flowchart shown in the FIG. 10(B) is deleted, and the second driving condition index $J_{12}$ in the flowchart shown in the FIG. 11 is changed to the first driving condition index $J_{11}$. With this arrangement, the correction driving condition index $J_{1a}$, as shown in FIG. 14, also changes moderately, and especially, the change speed of the correction driving condition index $J_{1a}$ is moderated more than that in the first embodiment at the low speed traveling, whereby, it is possible to give a more natural feel to the driver.

Moreover, in the above mentioned embodiments, the change amount of the driving condition indices $J_{11}$ or $J_{12}$ for each unit time is limited to the predetermined limit values at the time of both increase and decrease of the driving condition indices $J_{11}$ or $J_{12}$. However, it is possible to change the process in such a way that the change rate of the driving condition indices $J_{11}$ or $J_{12}$ is limited to the limit value at the time of only the increase or decrease (at the time of decrease is desirable).

This invention can be used without the road condition detecting means although the invention is combined with the road condition detecting means in the above-mentioned embodiments.

Obviously, numerous modifications and variations of the present invention may be possible in light of the above teachings. It is therefore to be understood that within the scope of the appended claims, the present invention may be practiced otherwise than as specifically described herein.

What is claimed as new and desired to be secured by Letters Patent of the United States is:

1. An improved device for detecting driving conditions for an automobile including:
   a speed sensor for detecting speed information which varies in response to the speed of said automobile;
   index arithmetic means for effecting computation of a driving condition index corresponding to a driving condition encountered by an operator of said automobile wherein said driving condition index is calculated from changes in said speed information;
   limit setting means for setting a limit value derived from said speed information, said limit value indicating a limit in the change rate of said driving condition index and varying depending upon the speed of said automobile;
   compensating means for compensating said driving condition index by using said limit value so that the rate of change of said driving condition index over a predetermined time period is restricted to said limit value when said rate of change exceeds said limit value.

2. A device for detecting driving condition for an automobile as set forth in claim 1, wherein said index arithmetic means includes arithmetic means for calculating a first continuously changing driving condition index derived from said speed information and converting means for converting said first driving condition index into a second driving condition index which has any one of several discrete values depending upon a particular value of said first driving condition index.

3. A device for detecting driving condition for an automobile as set forth in claim 1, wherein said index arithmetic means is composed of only arithmetic means for calculating, on the basis of said speed information, a continuously changing driving condition index.

4. A device for detecting driving condition for an automobile as set forth in claim 1, said limit setting means and said compensating means operate at the time of only the decrease of said driving condition index.

5. A device for detecting driving condition for an automobile as set forth in claim 1, wherein said limit setting means and said compensating means operate at the time of both increase and decrease of said driving condition index.

6. A device for detecting driving condition for an automobile as set forth in claim 5, said limit setting means is composed of memory means for storing the variation of said limit value with respect to an increment in the automobile speed and detecting means for detecting said limit value depending on said variation in accordance with said speed information, said variation of said limit value being arranged in such a way that said limit value increases according to the increment of the automobile speed.

7. A device for detecting driving condition for an automobile as set forth in claim 6, said memory means storing a first map exhibiting increasing limit value variations with respect to the increment in the automobile speed and a second map exhibiting decreasing limit value variations with respect to the increment in the automobile speed, and said detecting means operates to read out said increasing limit value variations corresponding to the automobile speed from said first map at the time of the increase of said driving condition index and to read out said decreasing limit value variations corresponding to the automobile speed from said second map at the time of the decrease of said driving condition index, said increasing limit value variations exhibited by a first map being larger than said decreasing limit value variations exhibited by the second map.

8. A device for detecting driving condition for an automobile set forth in claim 1, wherein said index arithmetic means comprises: reading means for reading information outputted from said speed sensor at a predetermined interval; acceleration computing means for obtaining acceleration by differentiating said information read by said reading means; absolute value computing means for obtaining an absolute value of said acceleration storage updating means for storing a predetermined number of updated absolute values of said acceleration in an updating manner which are obtained by said absolute value computing means; and index computing means for obtaining said driving condition index by integrating said predetermined number of absolute values of said acceleration stored in said storage updating means.

* * * * *